(12) United States Patent
Onggosanusi et al.

(10) Patent No.: US 11,632,157 B2
(45) Date of Patent: Apr. 18, 2023

(54) METHOD AND APPARATUS FOR INTERFERENCE MEASUREMENT

(71) Applicant: Samsung Electronics Co., Ltd., Suwon-si (KR)

(72) Inventors: Eko Onggosanusi, Coppell, TX (US); Md. Saifur Rahman, Plano, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 17/248,771

(22) Filed: Feb. 5, 2021

(65) Prior Publication Data

US 2021/0258059 A1   Aug. 19, 2021

Related U.S. Application Data

(60) Provisional application No. 62/976,161, filed on Feb. 13, 2020.

(51) Int. Cl.
 *H04L 5/00* (2006.01)
 *H04B 7/06* (2006.01)
 *H04B 17/336* (2015.01)
 *H04W 24/10* (2009.01)

(52) U.S. Cl.
 CPC ......... *H04B 7/0626* (2013.01); *H04B 7/0632* (2013.01); *H04B 17/336* (2015.01); *H04L 5/0048* (2013.01); *H04W 24/10* (2013.01)

(58) Field of Classification Search
 CPC .. H04B 7/0626; H04B 7/0632; H04B 17/336; H04B 7/0695; H04B 17/345; H04B 17/0087; H04L 5/0048; H04L 5/0073; H04L 5/0007; H04L 5/001; H04L 5/0035; H04L 25/02; H04L 5/0094; H04W 24/10
 See application file for complete search history.

(56) References Cited

U.S. PATENT DOCUMENTS

| 2014/0126402 A1 | 5/2014 | Nam et al. |
| 2016/0270091 A1 | 9/2016 | Frenne et al. |
| 2016/0278077 A1* | 9/2016 | Song ........................ H04W 8/22 |

(Continued)

FOREIGN PATENT DOCUMENTS

| WO | 2017095467 A1 | 6/2017 |
| WO | 2018021867 A1 | 2/2018 |

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.0.0, Dec. 2019, 246 pages.

(Continued)

*Primary Examiner* — Minh Trang T Nguyen

(57) ABSTRACT

Methods and apparatuses for interference measurement. A method for operating a user equipment (UE) includes receiving configuration information on at least three reference signal (RS) resources. Two of the at least three RS resources correspond to channel state information interference measurement (CSI-IM) resources. The method further includes measuring interference based on the CSI-IM resources, calculate a beam metric based on the measured interference, and transmitting the beam metric.

14 Claims, 8 Drawing Sheets

(56) References Cited

U.S. PATENT DOCUMENTS

2019/0261329 A1     8/2019    Park et al.
2019/0306924 A1*   10/2019   Zhang .................. H04L 5/0094

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.0.0, Dec. 2019, 250 pages.

"3rd Generation Partnership Project; Technical Specification Group Radio Access Network; Evolved Universal Terrestrial Radio Access (E-UTRA); Physical layer procedures (Release 16)", 3GPP TS 36.213 V16.0.0, Dec. 2019, 568 pages.

"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.

"LTE; Evolved Universal Terrestrial Radio Access (E-UTRA); Radio Resource Control (RRC); Protocol specification (3GPP TS 36.331 version 15.8.0 Release 15)", ETSI TS 136 331 V15.8.0, Jan. 2020, 969 pages.

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and channel coding (Release 16)", 3GPP TS 38.212 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"3rd Generation Partnership Project; Technical Specification Group Radio Access Network; NR; Physical layer measurements (Release 16)", 3GPP TS 38.215 V16.0.0, Dec. 2019, 21 pages.

"5G; NR; Medium Access Control (MAC) protocol specification (3GPP TS 38.321 version 15.8.0 Release 15)", ETSI TS 138 321 V15.8.0, Jan. 2020, 80 pages.

"5G; NR; Radio Resource Control (RRC); Protocol specification (3GPP TS 38.331 version 15.8.0 Release 15)", ETSI TS 138 331 V15.8.0, Jan. 2020, 527 pages.

"5G; NR; User Equipment (UE) radio access capabilities (3GPP TS 38.306 version 15.8.0 Release 15)", ETSI TS 138 306 V15.8.0, 62 pages.

International Search Report and Written Opinion of the International Searching Authority in connection with International Application No. PCT/KR2021/001850 dated May 24, 2021, 8 pages.

Extended European Search Report dated Dec. 9, 2022 regarding Application 21754194.5, 8 pages.

Apple Inc., "Feature Lead Summary on SCell BFR and L1-SINR", 3GPP TSG RAN WG1 #99, R1-1913372, Nov. 2019, 30 pages.

* cited by examiner

500

600

700

710

METHOD AND APPARATUS FOR INTERFERENCE MEASUREMENT

CROSS-REFERENCE TO RELATED APPLICATIONS AND CLAIM OF PRIORITY

This application claims priority to U.S. Provisional Patent Application No. 62/976,161 filed Feb. 13, 2020. The above-identified provisional patent applications are hereby incorporated by reference in their entirety.

TECHNICAL FIELD

The present disclosure relates generally to wireless communication systems and, more specifically, interference measurement.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Various embodiments of the present disclosure provide methods and apparatuses for interference measurement.

In one embodiment, a user equipment (UE) is provided. The UE includes a transceiver configured to receive configuration information on at least three reference signal (RS) resources. Two of the at least three RS resources correspond to CSI-IM resources. The UE further includes a processor operably connected to the transceiver. The processor is configured to measure interference based on the CSI-IM resources and calculate a beam metric based on the measured interference. The transceiver is further configured to transmit the beam metric.

In another embodiment, a base station (BS) is provided. The BS includes a processor configured to generate configuration information on at least three RS resources. Two of the at least three RS resources correspond to CSI-IM resources. The BS further includes a transceiver operably connected to the processor. The transceiver is configured to transmit, to a UE, the configuration information and receive, from the UE, a beam metric that indicates an interference measurement based on the CSI-IM resources.

In yet another embodiment, a method for operating a UE is provided. The method includes receiving configuration information on at least three RS resources. Two of the at least three RS resources correspond to CSI-IM resources. The method further includes measuring interference based on the CSI-IM resources, calculate a beam metric based on the measured interference, and transmitting the beam metric.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
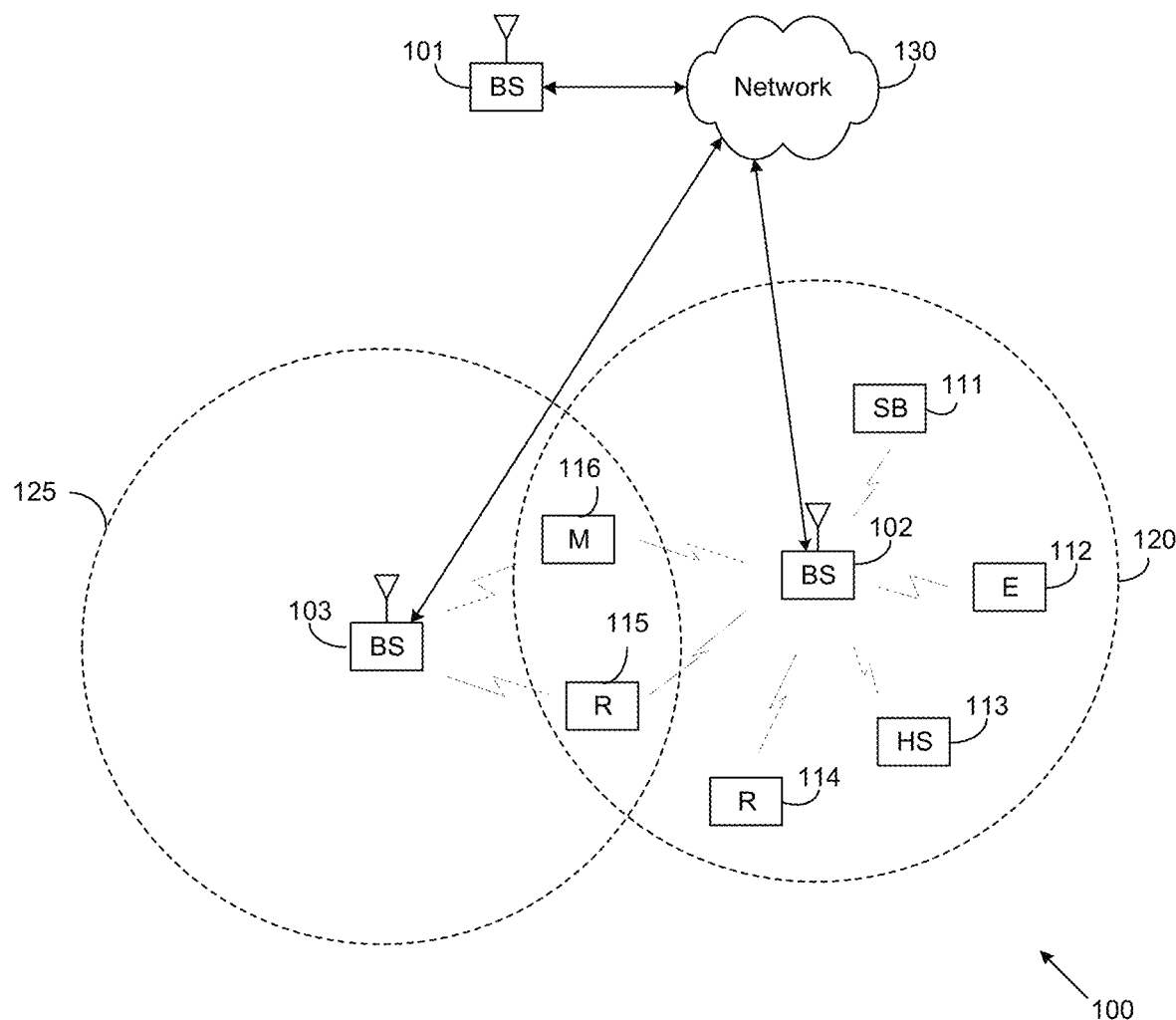
FIG. 1 illustrates an example wireless network according to various embodiments of the present disclosure.

FIGS. 1 through 9, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 16.0.0, "NR, Physical channels and modulation" ("REF 6"); 3GPP TS 38.212 version 16.0.0, "NR, Multiplexing and Channel coding" ("REF 7"); 3GPP TS 38.213 version 16.0.0, "NR, Physical Layer Procedures for Control" ("REF 8"); 3GPP TS 38.214 version 16.0.0, "NR, Physical Layer Procedures for Data" ("REF 9"); 3GPP TS 38.321 version 16.0.0, "NR, Medium Access Control (MAC) Protocol Specification" ("REF 10"); 3GPP TS 38.331 version 16.0.0, "NR, Radio Resource Control (RRC) Protocol Specification" ("REF 11"); and 3GPP TS 38.215 version 16.0.0, "NR, Physical Layer Measurements" ("REF 12")".

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS," an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmits interference measurement information to UEs 111-116 and configure UEs 111-116 for interference measurement as described in embodiments of the present disclosure. In various embodiments, one or more of UEs 111-116 receive interference measurement information as described in embodiments of the present disclosure.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks.

Figure 2A:
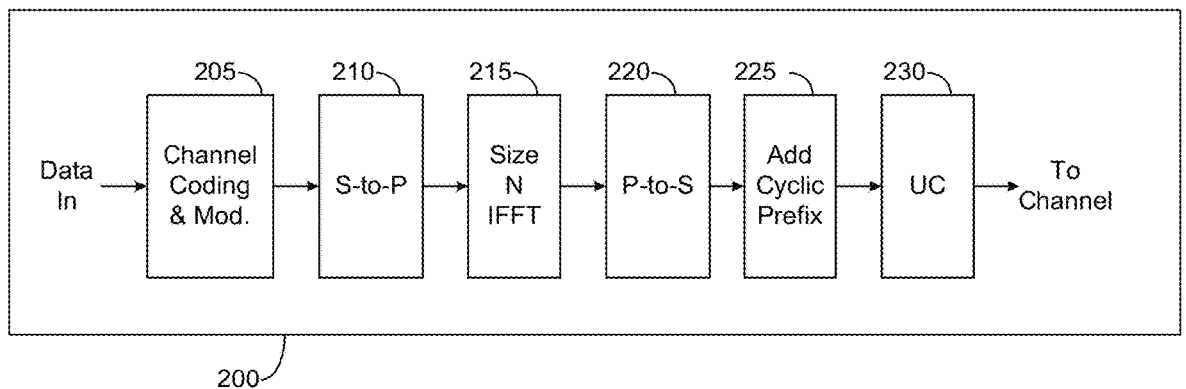
FIGS. 2A and 2B illustrate example wireless transmit and receive paths according to various embodiments of the present disclosure.
Figure 2B:
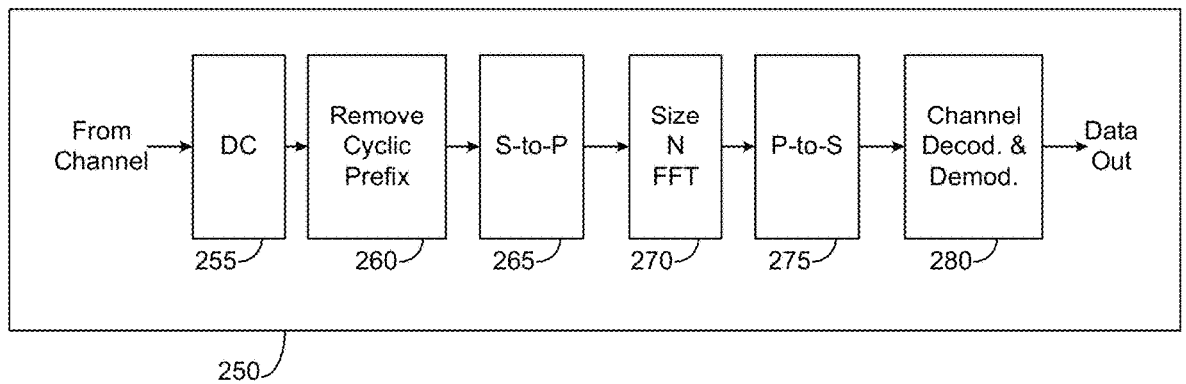

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB and that the transmit path 200 can be implemented in a UE. In some embodiments, the receive path 250 is configured to receive interference measurement information as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for beam reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
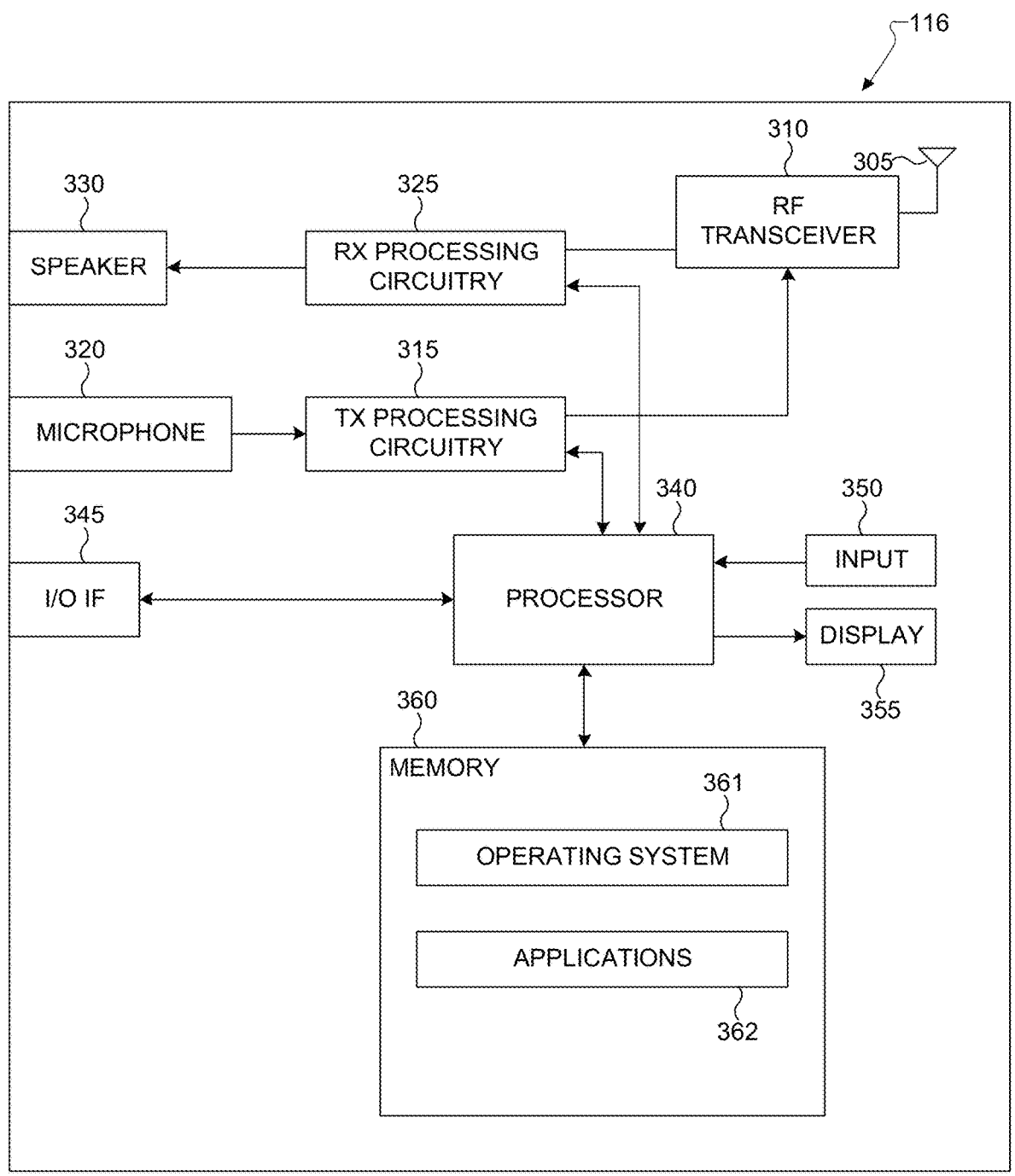
FIG. 3A illustrates an example UE according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for interference measurement for systems described in embodiments of the present disclosure as described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, the UE 116 can perform signaling and calculation based on interference measurement. Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
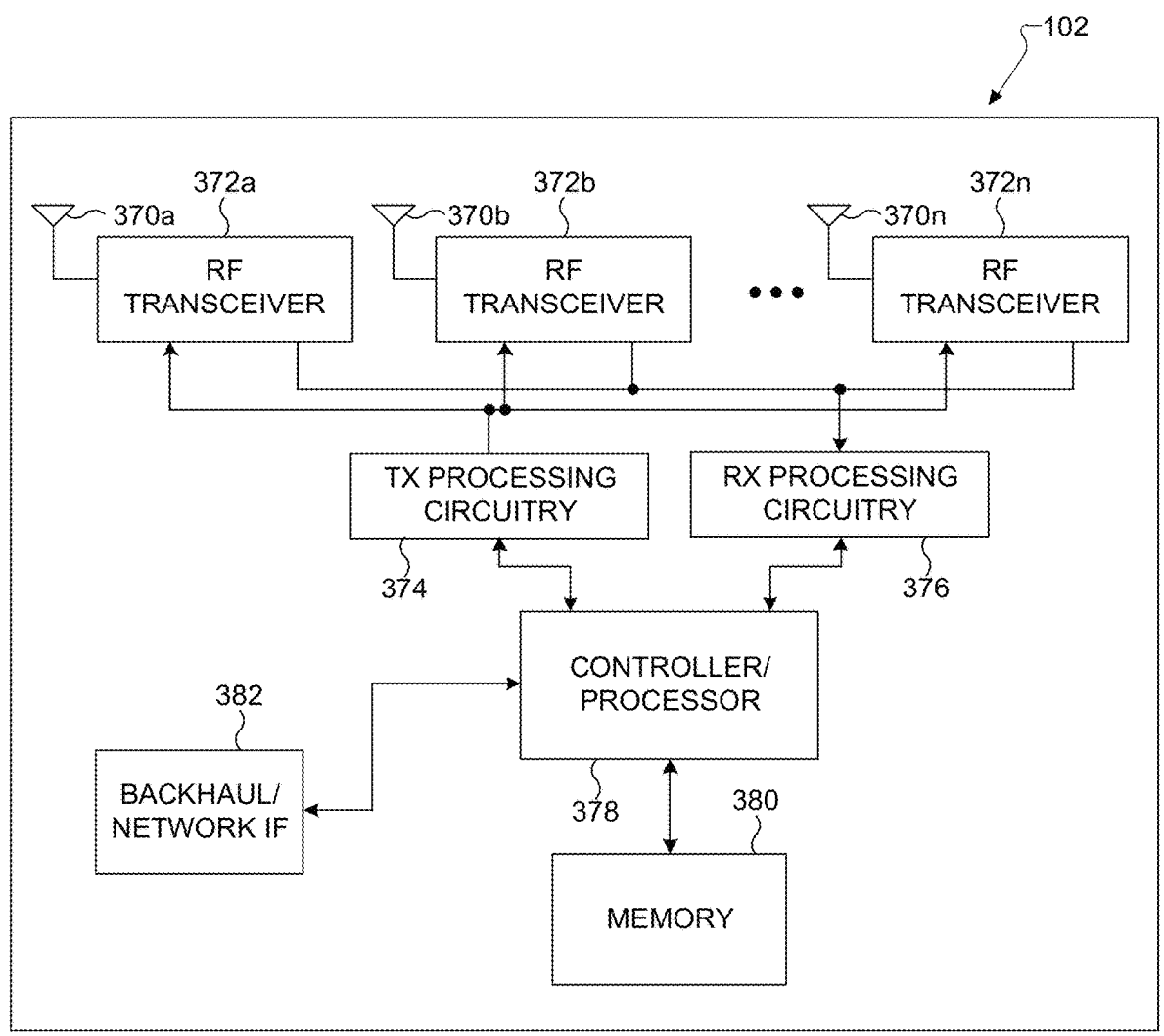
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) transmit configuration information for interference measurement to a UE and receive interference measurement information generated based thereon, respectively.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE and Rel.15 NR. For next generation cellular systems such as 5G, it is expected that the maximum number of CSI-RS ports remain more or less the same.

Figure 4:
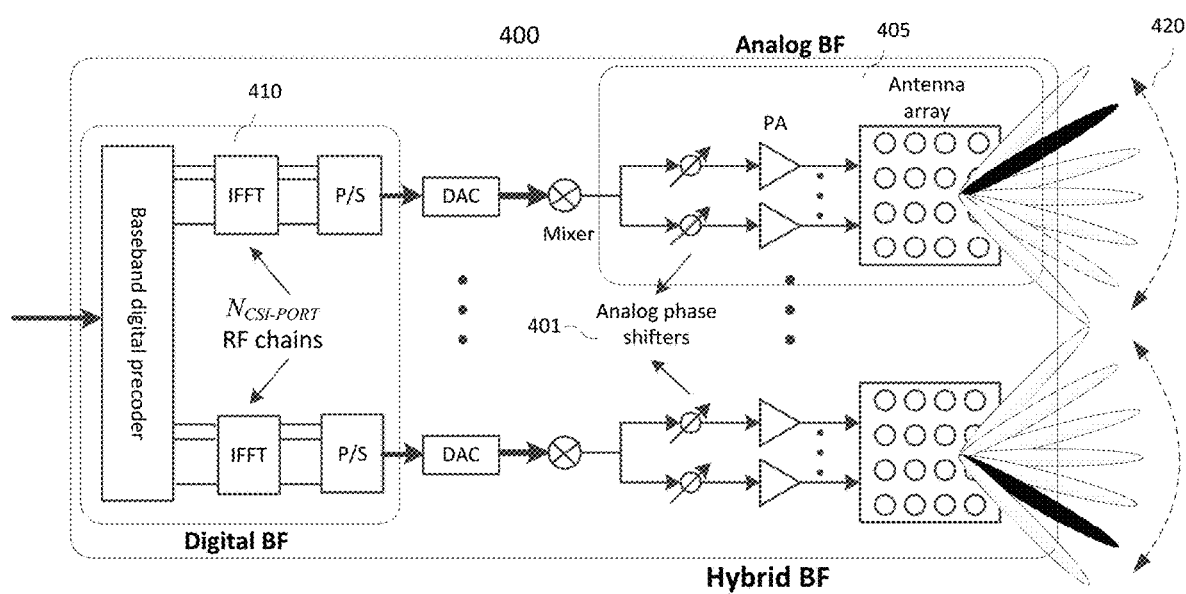
FIG. 4 illustrates an example beamforming architecture for a transmitter wherein one channel state information reference signal (CSI-RS) port is mapped onto a large number of analog-controlled antenna elements according to various embodiments of the present disclosure.
Figure 5:
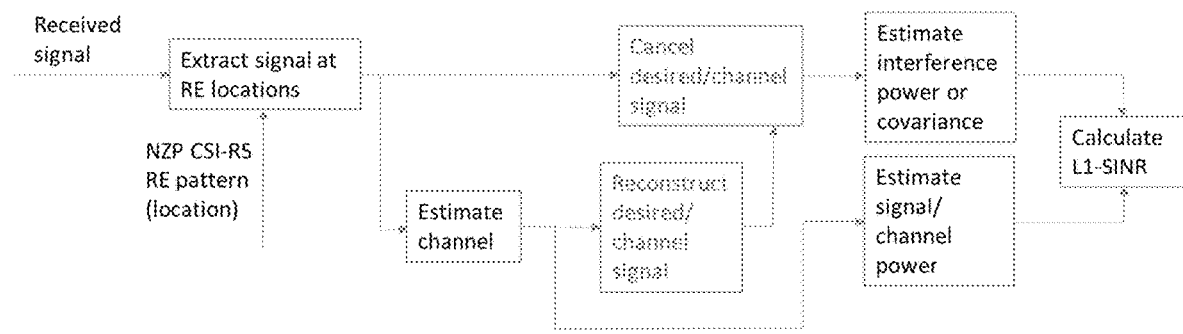
FIG. 5 illustrates a flow diagram of example interference estimation using NZP CSI-RS according to one or more embodiments of the present disclosure.
Figure 6:
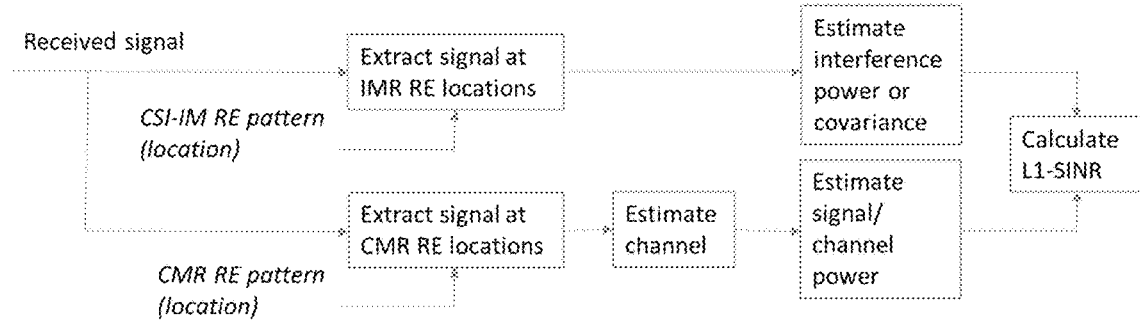
FIG. 6 illustrates a flow diagram of example interference estimation using CSI-IM according to one or more embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated by transmitter 400 of FIG. 4. For example, transmitter 400 may be present in the gNB 102 or the UE 116 of FIG. 1. The embodiment of the transmitter 400 shown in FIG. 4 is for illustration only, and other transmitters can have the same or similar configuration.

In the embodiment illustrated in FIG. 4, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR3). In this case, the system can employ only analog beams. Due to the $O_2$ absorption loss around 60 GHz frequency (~10 dB additional loss @ 100 m distance), larger number of and sharper analog beams (hence larger number of radiators in the array) will be needed to compensate for the additional path loss.

In Rel.15 NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be non-zero power (NZP) CSI-RS and/or SSB (synchronization signal block, which includes primary synchronization signal, secondary synchronization signal, and PBCH). Here, DL beam indication is done via the TCI field in DL-related downlink control information (DCI)

which includes an index to one (e.g., only one) assigned reference RS. For UL beam indication and measurement, the reference RS can be NZP CSI-RS, SSB, and/or SRS. Here, UL beam indication is done via the SRS resource indicator (SRI) field in UL-related DCI which is linked to one (e.g., only one) reference RS. This linkage is configured via higher-layer signaling using the SpatialRelationInfo RRC parameter. Essentially, only one TX beam may be indicated to the UE.

For DL multi-beam operation, other than DL beam indication, DL beam measurement and reporting are essential UE procedures to facilitate DL TX and RX beam selections. In Rel.15 NR, L1-RSRP, accompanied with an associated CSI-RS resource index (CRI) or SSB resource index (SSB-RI) which serves as the beam index/indicator, is used as the metric for beam reporting. The L1-RSRP is calculated from measuring CSI-RS (hence CSI-RSRP), SSB (hence SS-RSRP), or both. In Rel.16 NR, L1-SINR, accompanied with an associated CSI-RS resource index (CRI) or SSB resource index (SSB-RI) which serves as the beam index/indicator, is used as the metric for beam reporting. The signal part of the L1-SINR is calculated from measuring channel measurement resource (CMR) such as CSI-RS (hence CSI-RSRP), SSB (hence SS-RSRP), or both, where a CMR resource is non-zero-power (NZP). The interference part of the L1-SINR is calculated from measuring interference measurement resource (IMR) such as CSI-RS, CSI-IM, or both, where an IMR can be zero-power (ZP) or NZP.

Some of the pertinent scenarios for interference measurement are as follows.

In scenario 1, the interference measurement for L1-SINR (included in a beam report) is considered, which is introduced in Rel.16 NR with interference measurement based on Rel.15 NR. At least three options for L1-SINR calculation (cf. TS 38.214 sec 5.2.1.2) are supported. In a first option (Opt1), interference measurement is performed based on a NZP CSI-RS resource configured for channel measurement (CMR), where the density and the nrofPorts of the configured NZP CSI-RS resource is 3 RE/RB, and 1-port, respectively. In a second option (Opt2), interference measurement is performed based on a NZP CSI-RS resource configured for interference measurement (IMR), where the density and the nrofPorts of the configured NZP CSI-RS resource is 3 RE/RB, and 1-port, respectively. In a third option (Opt3), interference measurement is performed based on a CSI-IM resource. For Opt1 and Opt2, the UE needs to pre-cancel the desired/channel signal in order to measure interference (e.g., as illustrated in 500 of FIG. 5). For Opt3, if no signal is transmitted on CSI-IM ("zero power") from the serving gNB, the UE can simply measure the interference without pre-cancellation (e.g., as illustrated in 600 of FIG. 6). In this sense, Opt3 can offer a simpler and more accurate option for interference measurement over Opt1 and Opt2 only if the "zero power" constraint holds and can be assumed by the UE. Else (i.e., NZP CSI-IM), the benefit of CSI-IM over NZP CSI-RS is unclear. Note that CSI-IM occupies 4 RE/RB, i.e. at least 33% more overhead over NZP CSI-RS (with 3 RE/RB RE density). Note that for NZP CSI-RS, assumed transmitted signal (e.g. sequences) is specified (known to the UE), whereas CSI-IM is not associated with any assumed transmitted signal.

Note that adding an explicit "zero power" constraint to an IMR (i.e. the UE assumes that there is no signal transmission in the REs associated with the configured IMR) can be beneficial not only for system operation, but also for UE implementation.

In scenario 2, the interference emulation for L1-SINR (included in a beam report) is considered, which is pertinent mainly for DL multi-TRP/panel transmission where the interference from a transmitting TRP/panel is singled out and measured at a UE with a different serving TRP/panel. This scenario is illustrated, by way of example, in 700 and 710 of FIG. 7 for two-TRP scenario. Here, TRP X is the interfering TRP and TRP Y is the serving TRP. One NZP CSI-RS resource (x) associated with TRP X is configured to emulate interference from TRP X.

For Opt. A (diagram 700), the UE measures the emulated interference in the presence of 'signal y' from the serving TRP Y. To accurately estimate the interference, the 'signal y' is to be subtracted/removed. If the 'signal y' is known (e.g. RS sequence, PSS, SSS), it can be regenerated once channel estimation is completed and then subtracted from the received signal before measuring the emulated interference. If the 'signal y' is unknown (e.g. data, control), demodulation/decoding and re-encoding/modulation are to be performed before 'signal y' can be regenerated and subtracted from the received signal. This incurs additional UE complexity (calculation, buffering) and processing latency. For Opt B (diagram 710), on the other hand, the UE is further configured with a CSI-IM resource (y) from the serving TRP Y. If the "zero power" constraint holds for the CSI-IM resource (y) and can be assumed by the UE, the UE may directly measure the emulated interference without the complexity and latency for Opt A. However, the potential benefit from Opt B cannot be attained if the available RE patterns for NZP CSI-RS do not coincide with those for CSI-IM, which is the case in the current Rel. 15/16 NR specification. More specifically, first, from TS 38.214 sec 5.2.2.3.1, the supported RE (+CDM) patterns for NZP CSI-RS are given in TS 38.211 sec 7.4.1.5: (1) for 1-port CSI-RS, 0.5, 1, 3 RE/RB (with F-T shift), comb/checkerboard; (2) 2-port: 0.5, 1 RE/RB (with F-T shift), comb/checkerboard. Second, from TS 38.214 sec 5.2.2.4, the supported RE patterns for CSI-IM are given in TS 38.214 sec 5.2.2.4: (1) Pattern0: 1-port, 2×2=4 RE per RB (with F-T shift), cluster; (2) Pattern1: 1-port, 4×1=4 RE per RB (with F-T shift), cluster.

It is evident that the sets of available RE patterns for CSI-RS and CSI-IM do not coincide. The use cases that can benefit from interference emulation include multi-TRP/panel at the NW (gNB) side, and an extension of multi-beam operations to inter-cell mobility. For both use cases, accurate L1-SINR reflecting interference from secondary (non-serving) TRPs/cells can reduce the occurrence of beam failure.

In scenario 3, the interference measurement is for CQI calculation, which is pertinent to general CSI feedback, which is determined based on the estimated SINR. The signal part of the SINR is estimated using a CMR resource (e.g. NZP CSI-RS) measurement. The interference part of the SINR is estimated using an IMR (e.g. CSI-IM).

It is evident from above (Scenario 1-3) that for both L1-SINR (included in a beam report) and CQI calculation (for CSI feedback), an accurate measurement/estimation/emulation of interference is desired. This uses an IMR which can be ZP (for blanking) and having a time-frequency (T-F) pattern coinciding with those for a corresponding NZP IMR (for interference emulation).

Therefore, there is a need for interference measurement (IM) schemes that facilitate efficient configuration for IM resources in order for the UE to accurately measure and emulate interference for various scenarios.

In the following, for brevity, both FDD and TDD are considered as the duplex method for both DL and UL signaling.

Although example descriptions and embodiments to follow assume orthogonal frequency division multiplexing (OFDM) or orthogonal frequency division multiple access (OFDMA), embodiments of the present disclosure can be extended to other OFDM-based transmission waveforms or multiple access schemes such as filtered OFDM (F-OFDM).

This disclosure covers several components which can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

Terminology such as UL TX beam is used for illustrative purposes and therefore not normative. Other terms such as UL transmit spatial filter, referring to a spatial filtering operation applied by the UE on a transmitted UL signal, can also be used to represent the same functions.

A "reference RS" corresponds to a set of characteristics of UL TX beam (or UL transmit spatial filter), such as direction, precoding/beamforming, number of ports, etc. For instance, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam to the UE. Optionally, the reference RS can be transmitted by the UE (in this case, the reference RS is a downlink signal such as SRS or DMRS). As the NW/gNB receives the reference RS, the NW/gNB can measure and calculate the information to assign a particular UL TX beam to the UE. This option is applicable when DL-UL beam pair correspondence holds or is assumed.

The reference RS can be dynamically triggered by the NW/gNB (e.g. via DCI in case of AP RS), preconfigured with a certain time-domain behavior (such as periodicity and offset, in case of periodic RS), or a combination of such pre-configuration and activation/deactivation (in case of semi-persistent or SP RS).

The present disclosure includes the following components. A first component includes example embodiments for interference measurement based on one IM resource (IMR). A second component includes example embodiments for interference measurement or emulation based on two IMRs. A third component includes example embodiments for interference measurement or emulation based on N>1 IMRs.

For the first component (that is, interference measurement based on one IMR), in Embodiment 1, a UE is configured with one IMR for the purpose of interference measurement/estimation.

In one example embodiment 1.1, the IMR is a NZP CSI-RS. In another example, the IMR is a ZP CSI-RS.

In one example, the configuration of NZP CSI-RS resource(s) is according to Table 1. The configuration of a ZP CSI-RS resource for interference measurement is according to at least one of the following alternatives.

In Alt1.1.1: An additional RRC parameter (say zp-CSI-RS-InteferenceMeasurement) is used to configure a ZP CSI-RS for interference measurement. This parameter can be configured within the information element (IE) configuring the ZP CSI-RS. In one example, the additional parameter is as shown below (bold and underlined). If this parameter is provided, then the ZP CSI-RS resource is used for interference measurement. Else, it is used for other purpose (e.g. rate matching).

| ZP-CSI-RS-Resource information element |
| --- |
| -- ASN1START |
| -- TAG-ZP-CSI-RS-RESOURCE-START |
| ZP-CSI-RS-Resource ::=    SEQUENCE { |
|    zp-CSI-RS-ResourceId          ZP-CSI-RS-ResourceId, |
|    resourceMapping               CSI-RS-ResourceMapping, |
|    zp-CSI-RS-InteferenceMeasurement    ENUMERATED {enabled} |
|    OPTIONAL, |
|    periodicityAndOffset          CSI-ResourcePeriodicityAndOffset |
| OPTIONAL, --Cond PeriodicOrSemiPersistent |
|    ... |
| } |
| ZP-CSI-RS-ResourceId ::=    INTEGER (0..maxNrofZP-CSI-RS-Resources-1) |
| -- TAG-ZP-CSI-RESOURCE-STOP |
| -- ASN1STOP |

In one example, the additional parameter is as shown below (bold and underlined). If this parameter is enabled or ON, then the ZP CSI-RS resource is used for interference measurement. Else, it is used for other purpose (e.g. rate matching).

| ZP-CSI-RS-Resource information element |
| --- |
| ```
-- ASN1START
-- TAG-ZP-CSI-RS-RESOURCE-START
ZP-CSI-RS-Resource ::=           SEQUENCE {
   zp-CSI-RS-ResourceId              ZP-CSI-RS-ResourceId,
   resourceMapping                   CSI-RS-ResourceMapping,
   zp-CSI-RS-InteferenceMeasurement ENUMERATED {enabled, disabled} or {ON, OFF} OPTIONAL,
   periodicityAndOffset              CSI-ResourcePeriodicityAndOffset OPTIONAL, --Cond PeriodicOrSemiPersistent
   ...
}
ZP-CSI-RS-ResourceId ::=          INTEGER (0..maxNrofZP-CSI-RS-Resources-1)
-- TAG-ZP-CSI-RS-RESOURCE-STOP
-- ASN1STOP
``` |

In Alt1.1.2: A separate IE is used for interference measurement based on a ZP CSI-RS. This can be achieved by introducing separate (new) parameter(s) in each of the three IEs CSI-MeasConfig (used to configured measuement), CSI-ReportConfig (used to configure CSI report), and CSI-ResourceConfig (used to configure a resource). In one example, these new parameters are as shown below (bold and underlined).

| CSI-MeasConfig information element |
| --- |
| ```
-- ASN1START
-- TAG-CSI-MEASCONFIG-START
CSI-MeasConfig ::=                          SEQUENCE {
   nzp-CSI-RS-ResourceToAddModList          SEQUENCE (SIZE (1..maxNrofNZP-CSI-RS-Resources)) OF NZP-CSI-RS-Resource      OPTIONAL, -- Need N
   nzp-CSI-RS-ResourceToReleaseList         SEQUENCE (SIZE (1..maxNrofNZP-CSI-RS-Resources)) OF NZP-CSI-RS-ResourceId    OPTIONAL, -- Need N
   nzp-CSI-RS-ResourceSetToAddModList       SEQUENCE (SIZE (1..maxNrofNZP-CSI-RS-ResourceSets)) OF NZP-CSI-RS-ResourceSet OPTIONAL, -- Need N
   nzp-CSI-RS-ResourceSetToReleaseList      SEQUENCE (SIZE (1..maxNrofNZP-CSI-RS-ResourceSets)) OF NZP-CSI-RS-ResourceSetId OPTIONAL, -- Need N
   zp-CSI-RS-ResourceToAddModList           SEQUENCE (SIZE (1..maxNrofZP-CSI-RS-Resources)) OF ZP-CSI-RS-Resource    OPTIONAL, -- Need N
   zp-CSI-RS-ResourceToReleaseList          SEQUENCE (SIZE (1..maxNrofZP-CSI-RS-Resources)) OF ZP-CSI-RS-ResourceId  OPTIONAL, -- Need N
   zp-CSI-RS-ResourceSetToAddModList        SEQUENCE (SIZE (1..maxNrofZP-CSI-RS-ResourceSets)) OF ZP-CSI-RS-ResourceSet OPTIONAL, -- Need N
   zp-CSI-RS-ResourceSetToReleaseList       SEQUENCE (SIZE (1..maxNrofZP-CSI-RS-ResourceSets)) OF ZP-CSI-RS-ResourceSetId OPTIONAL, -- Need
   ...
}
-- TAG-CSI-MEASCONFIG-STOP
-- ASN1STOP
``` |

| CSI-ReportConfig information element |
| --- |
| ```
-- ASN1START
-- TAG-CSI-REPORTCONFIG-START
CSI-ReportConfig ::=                        SEQUENCE {
   reportConfigId                           CSI-ReportConfigId,
   carrier                                  ServCellIndex                OPTIONAL, -- Need S
   resourcesForChannelMeasurement           CSI-ResourceConfigId,
   csi-IM-ResourcesForInterference          CSI-ResourceConfigId         OPTIONAL, -- Need R
   nzp-CSI-RS-ResourcesForInterference      CSI-ResourceConfigId         OPTIONAL, -- Need R
   zp-CSI-RS-ResourcesForInterference       CSI-ResourceConfigId         OPTIONAL, -- Need R
   ...
}
``` |

| CSI-ResourceConfig information element |
| --- |
| ```
-- ASN1START
-- TAG-CSI-RESOURCECONFIG-START
CSI-ResourceConfig ::=       SEQUENCE {
   csi-ResourceConfigId         CSI-ResourceConfigId,
   csi-RS-ResourceSetList       CHOICE {
``` |

-continued

```
    nzp-CSI-RS-SSB              SEQUENCE {
        nzp-CSI-RS-ResourceSetList    SEQUENCE (SIZE (1..maxNrofNZP-CSI-RS-
ResourceSetsPerConfig)) OF NZP-CSI-RS-ResourceSetId
OPTIONAL), -- Need R
        csi-SSB-ResourceSetList       SEQUENCE (SIZE (1..maxNrofCSI-SSB
ResourceSetsPerConfig)) OF CSI-SSB-ResourceSetId
OPTIONAL -- Need R
    },
    csi-IM-ResourceSetList          SEQUENCE (SIZE (1..maxNrofCSI-IM-
ResourceSetsPerConfig)) OF CSI-IM-ResourceSetId
    zp-CSI-RS-ResourceSetList SEQUENCE (SIZE (1..maxNrofZP-CSI-RS-
    ResourceSetsPerConfig)) OF ZP-CSI-RS-ResourceSetId
    },
    bwp-Id              BWP-Id,
    resourceType        ENUMERATED { aperiodic, semiPersistent,
periodic },
    ...
}
-- TAG-CSI-RESOURCECONFIG-STOP
-- ASN1STOP
```

In Alt1.1.3: The configuration of a ZP CSI-RS resource includes all or some of the configuration parameters of a NZP CSI-RS resource except that the parameter powerControlOffset is either not provided (absent) or is set to zero value.

In Alt1.1.4, the configuration of ZP CSI-RS resource(s) is according to Table 2.

Note that the supported resourceMapping or time-frequency (T-F) patterns for both NZP and ZP CSI-RS resources are the same in these alternatives (Alt1.1.1 through 1.1.4).

For a ZP CSI-RS resource, the REs indicated by the parameter resourceMapping are declared "blanked", since there is no signal transmitted on those REs, and hence the measurement on those REs can be used for interference measurement.

Also, the configuration is ZP CSI-RS for interference measurement can be done without any linkage with a CSI-IM resource (that is it is independent of any CSI-IM resource configuration). Or, the configuration is ZP CSI-RS for interference

TABLE 1 an example of NZP (or ZP) CSI-RS configuration

The UE can be configured with one or more NZP CSI-RS resource set configuration(s) as indicated by the higher layer parameters CSI-ResourceConfig, and NZP-CSI-RS-ResourceSet. Each NZP CSI-RS resource set consists of K ≥ 1 NZP CSI-RS resource(s).
The following parameters for which the UE shall assume non-zero transmission power for CSI-RS resource are configured via the higher layer parameter NZP-CSI-RS-Resource, CSI-ResourceConfig and NZP-CSI-RS-ResourceSet for each CSI-RS resource configuration:
nzp-CSI-RS-ResourceId determines CSI-RS resource configuration identity.
periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources.
resourceMapping defines the number of ports, CDM-type, and OFDM symbol and subcarrier occupancy of the CSI-RS resource within a slot that are given in Clause 7.4.1.5 of [4, TS 38.211].
nrofPorts in resourceMapping defines the number of CSI-RS ports, where the allowable values are given in Clause 7.4.1.5 of [4, TS 38.211].
density in resourceMapping defines CSI-RS frequency density of each CSI-RS port per PRB, and CSI-RS PRB offset in case of the density value of 1/2, where the allowable values are given in Clause 7.4.1.5 of [4, TS 38.211]. For density 1/2, the odd/even PRB allocation indicated in density is with respect to the common resource block grid.
cdm-Type in resourceMapping defines CDM values and pattern, where the allowable values are given in Clause 7.4.1.5 of [4, TS 38.211].
powerControlOffset: which is the assumed ratio of PDSCH EPRE to NZP CSI-RS EPRE when UE derives CSI feedback and takes values in the range of [−8, 15] dB with 1 dB step size.
powerControlOffsetSS: which is the assumed ratio of NZP CSI-RS EPRE to SS/PBCH block EPRE.
scramblingID defines scrambling ID of CSI-RS with length of 10 bits.
BWP-Id in CSI-ResourceConfig defines which bandwidth part the configured CSI-RS is located in.
repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not as described in Clause 5.1.6.1.2. and can be configured only when the higher layer parameter reportQuantity associated with all the reporting settings linked with the CSI-RS resource set is set to 'cri-RSRP', 'cri-SINR' or 'none'.

TABLE 1-continued an example of NZP (or ZP) CSI-RS configuration qcl-InfoPeriodicCSI-RS contains a reference to a TCI-State indicating QCL source RS(s) and QCL type(s). If the TCI-State is configured with a reference to an RS with 'QCL-TypeD' association, that RS may be an SS/PBCH block located in the same or different CC/DL BWP or a CSI-RS resource configured as periodic located in the same or different CC/DL BWP.
trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same as described in Clause 5.1.6.1.1 and can be configured when reporting setting is not configured or when the higher layer parameter reportQuantity associated with all the reporting settings linked with the CSI-RS resource set is set to 'none'.
All CSI-RS resources within one set are configured with same density and same nrofPorts, except for the NZP CSI-RS resources used for interference measurement.
The UE expects that all the CSI-RS resources of a resource set are configured with the same starting RB and number of RBs and the same cdm-type.
The bandwidth and initial common resource block (CRB) index of a CSI-RS resource within a BWP, as defined in Clause 7.4.1.5 of [4, TS 38.211], are determined based on the higher layer parameters nrofRBs and startingRB, respectively, within the CSI-FrequencyOccupation IE configured by the higher layer parameter freqBand within the CSI-RS-ResourceMapping IE. Both nrofRBs and startingRB are configured as integer multiples of 4 RBs, and the reference point for startingRB is CRB 0 on the common resource block grid. If startingRB $< N_{BWP}^{start}$, the UE shall assume that the initial CRB index of the CSI-RS resource is $N_{initial\ RB} = N_{BWP}^{start}$, otherwise $N_{initial\ RB}$ = startingRB. If nrofRBs $> N_{BWP}^{size} + N_{BWP}^{start} - N_{initial\ RB}$, the UE shall assume that the bandwidth of the CSI-RS resource is $N_{CSI-RS}^{BW} = N_{BWP}^{size} + N_{BWP}^{start} - N_{initial\ RB}$, otherwise $N_{CSI-RS}^{BW}$ = nrofRBs. In all cases, the UE shall expect that $N_{CSI-RS}^{BW} \geq \min(24, N_{BWP}^{size})$.

TABLE 2 an example of ZP CSI-RS configuration

Within a BWP, the UE can be configured with one or more ZP CSI-RS resource set configuration(s) for aperiodic, semi-persistent and periodic time-domain behaviours (higher layer parameters aperiodic-ZP-CSI-RS-ResourceSetsToAddModList, sp-ZP-CSI-RS-ResourceSetsToAddModList and p-ZP-CSI-RS-ResourceSet respectively comprised in PDSCH-Config), with each ZP-CSI-RS resource set consisting of at most X (e.g. X = 16) ZP CSI-RS resources (higher layer parameter ZP-CSI-RS-Resource) in numerology of the BWP. The REs indicated by p-ZP-CSI-RS-ResourceSet are declared "blanked", since there is no signal transmitted on those REs, and hence the measurement on those REs can be used for interference measurement. The REs indicated by sp-ZP-CSI-RS-ResourceSetsToAddModList and aperiodic-ZP-CSI-RS-ResourceSetsToAddModList are declared "blanked", hence they can be used for interference measurement when their triggering and activation are applied, respectively. The following parameters are configured via higher layer signaling for each ZP CSI-RS resource configuration:
zp-CSI-RS-ResourceId in ZP-CSI-RS-Resource determines ZP CSI-RS resource configuration identity.
nrofPorts defines the number of CSI-RS ports, where the allowable values are given in Clause 7.4.1.5 of [4, TS 38.211].
cdm-Type defines CDM values and pattern, where the allowable values are given in Clause 7.4.1.5 of [4, TS 38.211].
resourceMapping given by ZP-CSI-RS-Resource defines the OFDM symbol and subcarrier occupancy of the ZP-CSI-RS resource within a slot that are given in Clause 7.4.1.5 of [4, TS 38.211].
periodicityAndOffset in ZP-CSI-RS-Resource defines the ZP-CSI-RS periodicity and slot offset for periodic/semi-persistent ZP-CSI-RS.

In another example embodiment 1.2, the IMR is a NZP CSI-IM. In another example, the IMR is a ZP CSI-IM. The configuration of ZP or NZP CSI-IM resource for interference measurement is according to at least one of the following alternatives.

In Alt1.2.1: the configuration of ZP or NZP CSI-IM resource(s) is according to Table 3. The parameter csi-IM-powerControlOffset is configured only for NZP CSI-IM resource when UE derives L1-SINR (in a beam report) or CQI (in a CSI feedback). In one example, it takes values in the range of [−8, 15] dB with 1 dB step size. The configuration of a ZP CSI-IM resource includes all configuration parameters of a NZP CSI-IM resource except that the parameter csi-IM-powerControlOffset is either not provided (absent) or is set to zero value. Note that the two time-frequency (T-F) patterns, pattern0 and pattern1 are supported for both NZP and ZP CSI-IM resources. For a ZP CSI-IM resource, the REs indicated by the time-frequency (T-F) patterns, pattern0 or pattern1, are declared "blanked", since there is no signal transmitted on those REs, and hence the measurement on those REs can be used for interference measurement.

TABLE 3 an example of NZP (or ZP) CSI-IM configuration

The UE can be configured with one or more CSI-IM resource set configuration(s) as indicated by the higher layer parameter CSI-IM-ResourceSet. Each CSI-IM resource set consists of K ≥ 1 CSI-IM resource(s).
The following parameters are configured via higher layer parameter CSI-IM-Resource for each CSI-IM resource configuration:
csi-IM-ResourceId determines CSI-IM resource configuration identity
subcarrierLocation-p0 or subcarrierLocation-p1 defines subcarrier occupancy of the CSI-IM resource within a slot for csi-IM-ResourceElementPattern set to 'pattern0' or 'pattern1', respectively.
symbolLocation-p0 or symbolLocation-p1 defines OFDM symbol location of the CSI-IM resource within a slot for csi-IM-ResourceElementPattern set to 'pattern0' or 'pattern1', respectively.
periodicityAndOffset defines the CSI-IM periodicity and slot offset for periodic/semi-persistent CSI-IM.
freqBand includes parameters to enable configuration of frequency-occupancy of CSI-IM
csi-IM-powerControlOffset: which is the assumed ratio of PDSCH EPRE to NZP CSI-IM EPRE
In each of the PRBs configured by freqBand, the UE shall assume each CSI-IM resource is located in,
resource elements $(k_{CSI-IM}, l_{CSI-IM})$, $(k_{CSI-IM}, l_{CSI-IM} + 1)$, $(k_{CSI-IM} + 1, l_{CSI-IM})$ and $(k_{CSI-IM} + 1, l_{CSI-IM} + 1)$, if csi-IM-ResourceElementPattern is set to 'pattern0',
resource elements $(k_{CSI-IM}, l_{CSI-IM})$, $(k_{CSI-IM} + 1, l_{CSI-IM})$, $(k_{CSI-IM} + 2, l_{CSI-IM})$ and $(k_{CSI-IM} + 3, l_{CSI-IM})$ if csi-IM-ResourceElementPattern is set to 'pattern1',
where $k_{CSI-IM}$ and $l_{CSI-IM}$ are the configured frequency-domain location and time-domain location, respectively, given by the higher layer parameters in the above list.

In one example, the additional parameter is as shown below (bold and underlined).

| CSI-IM-Resource information element |  |
|---|---|
| -- ASN1START |  |
| -- TAG-CSI-IM-RESOURCE-START |  |
| CSI-IM-Resource ::= | SEQUENCE { |
|   csi-IM-ResourceId | CSI-IM-ResourceId, |
|   csi-IM-ResourceElementPattern | CHOICE { |
|     pattern0 | SEQUENCE { |
|       ... |  |
|     }, |  |
|     pattern1 | SEQUENCE { |
|       ... |  |
|     } |  |
|   } |  |
|   csi-IM-powerControlOffset | INTEGER (–8..15), |
| ... |  |

-continued

| CSI-IM-Resource information element |
|---|
| } |
| -- TAG-CSI-IM-RESOURCE-STOP |
| -- ASN1STOP |

In Alt1.2.2: the configuration of ZP CSI-IM resource(s) is according to Table 4, where the supported resourceMapping or time-frequency (T-F) patterns for a ZP CSI-IM resources is the same as that for a NZP CSI-RS resource. In one example, a CSI-IM resource according to Table 4 can never be configured independently (or is always associated with or lined to another resource). That is, if such a CSI-IM resource is configured, there will be a companion resource (e.g. CSI-RS resource) configured for the UE with the same exact T-F pattern.

TABLE 4 an example of ZP CSI-IM configuration

The UE can be configured with one or more CSI-IM resource set configuration(s) as indicated by the higher layer parameter CSI-IM-ResourceSet. Each CSI-IM resource set consists of K ≥ 1 CSI-IM resource(s).
The following parameters are configured via higher layer parameter CSI-IM-Resource for each CSI-IM resource configuration:
csi-IM-ResourceId determines CSI-IM resource configuration identity
subcarrierLocation-p0 or subcarrierLocation-p1 defines subcarrier occupancy of the CSI-IM resource within a slot for csi-IM-ResourceElementPattern set to 'pattern0' or 'pattern1', respectively.
resourceMapping given by ZP-CSI-IM-Resource defines the OFDM symbol and subcarrier occupancy of the ZP-CSI-IM resource within a slot that are given in Clause 7.4.1.5 of [4, TS 38.211].
periodicityAndOffset defines the CSI-IM periodicity and slot offset for periodic/semi-persistent CSI-IM.
freqBand includes parameters to enable configuration of frequency-occupancy of CSI-IM
In each of the PRBs configured by freqBand, the UE shall assume each CSI-IM resource is located in the T-F RE patterns given by resourceMapping.

In one example, a CSI-IM resource according to Table 4 can never be configured independently (or is always associated with or lined to another resource). That is, if such a CSI-IM resource is configured, there will be a companion resource (e.g. CSI-RS resource) configured for the UE with the same exact T-F pattern.

In Alt1.2.3: the configuration of ZP CSI-IM resource(s) is Table 5, where the parameter csi-IM-pattern configured a time-frequency (T-F) pattern for ZP CSI-IM resources, which is according to at least one of the following examples. In one example (Ex 1.2.3.1), csi-IM-pattern includes 'pattern0', 'pattern1', and at least one new pattern 'pattern2', where the new pattern 'pattern2' is at least one pattern configured for a NZP/ZP CSI-RS resource via parameter resourceMapping. In another example (Ex 1.2.3.2), csi-IM-pattern includes 'pattern0', 'pattern1', and a new pattern 'pattern2', where the new pattern 'pattern2' can be anyone pattern configured for a NZP/ZP CSI-RS resource via parameter resourceMapping. In another example (Ex 1.2.3.3), csi-IM-pattern includes 'pattern0', 'pattern1', and a new pattern 'pattern2', where the new pattern 'pattern2' can be a subset of all possible patterns that can be configured for a NZP/ZP CSI-RS resource via parameter resourceMapping. In one example, this subset of patterns can be determined based on the number of ports (e.g. only 1 port, either 1 or 2, etc.). In one example, this subset of patterns can be determined based on the number of ports (e.g. only 1 port, either 1 or 2, etc.) and/or RE density (e.g. 1 RE/RB only 3 RE/RB only 1 or 3 RE/RB).

TABLE 5 an example of ZP CSI-IM configuration

The UE can be configured with one or more CSI-IM resource set configuration(s) as indicated by the higher layer parameter CSI-IM-ResourceSet. Each CSI-IM resource set consists of K ≥ 1 CSI-IM resource(s).
The following parameters are configured via higher layer parameter CSI-IM-Resource for each CSI-IM resource configuration:
csi-IM-ResourceId determines CSI-IM resource configuration identity
subcarrierLocation-p0 or subcarrierLocation-p1 defines subcarrier occupancy of the
CSI-IM resource within a slot for csi-IM-ResourceElementPattern set to 'pattern0' or 'pattern1', respectively.
csi-IM-pattern
periodicityAndOffset defines the CSI-IM periodicity and slot offset for periodic/semi-persistent CSI-IM.
freqBand includes parameters to enable configuration of frequency-occupancy of CSI-IM
In each of the PRBs configured by freqBand, the UE shall assume each CSI-IM resource is located in the T-F RE patterns given by resourceMapping.

In one example, the additional pattern is as shown below (bold and underlined).

| CSI-IM-Resource information element | |
|---|---|
| -- ASN1START | |
| -- TAG-CSI-IM-RESOURCE-START | |
| CSI-IM-Resource ::= | SEQUENCE { |
| csi-IM-ResourceId | CSI-IM-ResourceId, |
| csi-IM-ResourceElementPattern | CHOICE { |
| pattern0 | SEQUENCE { |
| ... | |
| }, | |
| pattern1 | SEQUENCE { |
| ... | |

| CSI-IM-Resource information element | |
|---|---|
| Pattern2 | SEQUENCE { |
| ... | |
| } | |
| } | |
| ... | |
| } | |
| -- TAG-CSI-IM-RESOURCE-STOP | |
| -- ASN1STOP | |

In this embodiment, the IMR may not be associated with any other resources, i.e., the IMR is used for interference measurement only. Though, this interference measurement can be linked to (or used for) L1-SINR calculation, or CSI feedback in general. This linking can be via a CSI reporting Setting parameter (e.g. CSI-ReportConfig).

For a NZP CSI-IM resource, the transmitted signal can be left to network (NW). Alternatively, the transmitted signal is configured to the UE, which for instance, can be similar to that for a NZP CSI-RS resource. The transmitted signal can also be TRP/panel-specific.

In a variation of this embodiment (embodiment 1.3), the IMR can be associated with an NZP CMR resource, which is configured to the UE for channel measurement. In this variation, the configured IMR and CMR resources can be used to obtain some information about the DL channel, which can be CSI feedback (SINR, CQI, PMI etc.), or beam report (L1-SINR, CRI, etc.). The CMR and IMRs can be configured to be transmitted from the same TRP/panel or gNB (which is the case when the UE is connected to a single TRP/gNB). A few examples of the configured (CMR, IMR) resource pairs in this case includes (NZP CSI-RS, ZP CSI-IM) and (NZP CSI-IM, ZP CSI-RS), where the T-F patterns of CMR and IMRs are different (non-overlapping). Or, the CMR and IMRs can be configured to be transmitted from two different TRPs/panels or gNBs (which is the case when the UE is connected to two TRPs or gNBs, A and B, and receives CMR from A and IMR from B). A few examples of the configured (CMR, IMR) resource pairs includes (NZP CSI-RS, ZP CSI-RS), (NZP CSI-IM, ZP CSI-IM), (NZP CSI-RS, ZP CSI-IM), (NZP CSI-IM, ZP CSI-RS), where the T-F patterns of CMR and IMRs can be the same (overlapping) or different (non-overlapping or partial-overlapping).

TABLE 6

| Configuration No. | Measurement | CMR (from A) | IMR (from B) |
|---|---|---|---|
| 1 | Signal from A, interference from B | NZP CSI-RS | ZP CSI-RS |
| 2 | Signal from A, interference from B | NZP CSI-IM | ZP CSI-IM |
| 3 | Signal from A, interference from B | NZP CSI-RS | ZP CSI-IM |
| 4 | Signal from A, interference from B | NZP CSI-IM | ZP CSI-RS |

The association between the CMR and IMRs can be established via a dedicated signaling, for example, using as a separate RRC component/parameter (e.g. in CSI framework) which established an association between a CMR resource and an IMR, or using an existing RRC component/parameter (e.g. CSI-ReportConfig in the Rel. 15/16 NR CSI framework). An example of this association (configuration) is shown in Table 6. Alternatively, the association between the CMR and IMRs can be established implicitly. For example, a ZP IMR (e.g. ZP CSI-IM) is always associated with a CMR resource, and this association is established implicitly, for example, via the configuration of the CMR resource.

In a variation of this embodiment (embodiment 1.4), the IMR can be associated with an another IMR (say IMR0), which is configured to the UE for interference emulation, where one of the two resources is NZP and the other is ZP. In this variation, the two configured IMRs can be used to obtain some information about the DL channel, which can be CSI feedback (SINR, CQI, PMI etc.), or beam report (L1-SINR, CRI, etc.). The two IMRs are configured to be transmitted from two different TRPs/panels or gNBs (which is the case when the UE is connected to two TRPs or gNBs, A and B, and receives one IMR from A and another IMR from B). A few examples of the two configured IMR pairs includes (NZP X, ZP Y), (ZP X, NZP Y), where X and Y belongs to {CSI-RS, CS-IM}, and the T-F patterns of the two IMRs can be the same (overlapping) or different (non-overlapping or partial-overlapping). The association between the two IMRs can be established via a dedicated signaling or implicitly as explained above. An example of this association (configuration) is shown in Table 7.

TABLE 7

| Configuration No. | Measurement | IMR (from A) | IMR0 (from B) |
|---|---|---|---|
| 1 | B serving, interference (emulation) from A | NZP CSI-RS | ZP CSI-RS |
| 2 | B serving, interference (emulation) from A | NZP CSI-IM | ZP CSI-IM |
| 3 | B serving, interference (emulation) from A | NZP CSI-RS | ZP CSI-IM |
| 4 | B serving, interference (emulation) from A | NZP CSI-IM | ZP CSI-RS |

For the second component (that is, interference measurement or emulation based on two IMRs), in embodiment 2, a UE is configured with two IMRs (IMR1, IMR2) for the purpose of interference measurement/estimation/emulation, where one of the two IMRs is NZP and the other is ZP. As an example, we assume that IMR1 is NZP and IMR2 is ZP. The embodiment is general and is applicable to the other case when IMR1 is ZP and IMR2 is NZP, by swapping/replacing (IMR1, IMR2) with (IMR2, IMR1). The T-F RE patterns of the two IMRs (IMR1, IMR2) can be identical (fully overlapping). Such IMR configurations can be used for interference emulation purpose (cf. FIG. 7). Or, the T-F RE patterns of the two IMRs (IMR1, IMR2) can be different but partially overlapping (have some overlapping REs). Such IMR configurations can be used for interference emulation (cf. FIG. 7) based on overlapping REs only.

A few examples of (IMR1, IMR2) configurations are as follows.

In example embodiment 2.1, (IMR1, IMR2)=(NZP CSI-RS, ZP CSI-RS). The configuration of IMR1 (NZP CSI-RS resource) is according to Table 1. The configuration of IMR2 (ZP CSI-RS resource) can include all configuration parameters of a NZP CSI-RS resource except that the parameter powerControlOffset is either not provided (absent) or is set to zero value. In an alternative, the configuration of IMR2 (ZP CSI-RS resource) is according to Table 2. Note that the supported resourceMapping or time-frequency (T-F) patterns for both NZP and ZP CSI-RS resources are the same. For a ZP CSI-RS resource, the REs indicated by the parameter resourceMapping are declared "blanked", since there is no signal transmitted on those REs, and hence the measurement on those REs can be used for interference measurement. Such a configuration of (IMR1, IMR2) can be used for interference emulation as shown in Opt. B of FIG. 7, wherein 'NZP CSI-RS x' is replaced with IMR1 and 'CSI-IM y' is replaced with IMR2. Note that the RE patterns of IMR1 and IMR2 are identical. In an alternative, the configuration of IMR2=ZP CSI-RS is according to at least one of alternative Alt 1.1.1 through Alt 1.1.4 (including the details or/and any restriction explained above).

In example embodiment 2.2, (IMR1, IMR2)=(NZP CSI-RS, ZP CSI-IM). The configuration of IMR1 (NZP CSI-RS resource) is according to Table 1. The configuration of IMR2 (ZP CSI-IM resource) is according to Table 3 except that the parameter csi-IM-powerControlOffset is either not provided (absent) or is set to zero value. Note that the two time-frequency (T-F) patterns, for NZP CSI-RS and ZP CSI-IM resources are different. For a ZP CSI-IM resource, the REs indicated by the time-frequency (T-F) patterns, pattern0 or pattern1, are declared "blanked", since there is no signal transmitted on those REs, and hence the measurement on those REs can be used for interference measurement. If there is some overlapping REs between the T-F patterns of IMR1 and IMR2, then such a configuration of (IMR1, IMR2) can be used for interference emulation as shown in Opt. B of FIG. 7, wherein 'NZP CSI-RS x' is replaced with IMR1 and 'CSI-IM y' is replaced with IMR2. Note that the RE patterns of IMR1 and IMR2 are identical. In an alternative, the configuration of IMR2=ZP CSI-IM is according to at least one of alternative Alt 1.2.1 through Alt 1.2.3 (including the details or/and any restriction explained above).

In example embodiment 2.2a, (IMR1, IMR2)=(NZP CSI-RS, ZP CSI-IM). The configuration of IMR1 (NZP CSI-RS resource) is according to Table 1. The configuration of IMR2 (ZP CSI-IM resource) is according to Table 4. The two time-frequency (T-F) patterns, for NZP CSI-RS and ZP CSI-IM resources are the same. For a ZP CSI-IM resource, the REs indicated by the time-frequency (T-F) patterns, pattern0 or pattern1, are declared "blanked", since there is no signal transmitted on those REs, and hence the measurement on those REs can be used for interference measurement. Such a configuration of (IMR1, IMR2) can be used for interference emulation as shown in Opt. B of FIG. 7, wherein 'NZP CSI-RS x' is replaced with IMR1 and 'CSI-IM y' is replaced with IMR2. Note that the RE patterns of IMR1 and IMR2 are identical. In an alternative, the configuration of IMR2=ZP CSI-IM is according to at least one of alternative Alt 1.2.1 through Alt 1.2.3 (including the details or/and any restriction explained above).

In example embodiment 2.2b, (IMR1, IMR2)=(NZP CSI-RS, ZP CSI-IM). The configuration of IMR1 (NZP CSI-RS resource) is according to Table 1. The configuration of IMR2 (ZP CSI-IM resource) is according to Table 4. The two time-frequency (T-F) patterns, for NZP CSI-RS and ZP CSI-IM resources can be different. For a ZP CSI-IM resource, the REs indicated by the time-frequency (T-F) patterns, pattern0 or pattern1, are declared "blanked", since there is no signal transmitted on those REs, and hence the measurement on those REs can be used for interference measurement. If there is some overlapping REs between the T-F patterns of IMR1 and IMR2, then such a configuration of (IMR1, IMR2) can be used for interference emulation as shown in Opt. B of FIG. 7, wherein 'NZP CSI-RS x' is replaced with IMR1 and 'CSI-IM y' is replaced with IMR2. Note that the RE patterns of IMR1 and IMR2 are identical. In an alternative, the configuration of IMR2=ZP CSI-IM is according to at least one of alternative Alt 1.2.1 through Alt 1.2.3 (including the details or/and any restriction explained above).

In example embodiment 2.3, (IMR1, IMR2)=(NZP CSI-IM, ZP CSI-RS). The configuration of IMR1 (NZP CSI-IM resource) is according to Table 3. The configuration of IMR2 (ZP CSI-RS resource) is according to Table 1 except that the parameter powerControlOffset is either not provided (absent) or is set to zero value. In an alternative, the configuration of IMR2 (ZP CSI-RS resource) is according to Table 2. Note that the two time-frequency (T-F) patterns, for both NZP CSI-IM and ZP CSI-RS resources are different. For a ZP CSI-RS resource, the REs indicated by the parameter resourceMapping are declared "blanked", since there is no signal transmitted on those REs, and hence the measurement on those REs can be used for interference measurement. If there is some overlapping REs between the T-F patterns of IMR1 and IMR2, then such a configuration of (IMR1, IMR2) can be used for interference emulation as shown in Opt. B of FIG. 7, wherein 'NZP CSI-RS x' is replaced with IMR1 and 'CSI-IM y' is replaced with IMR2. Note that the RE patterns of IMR1 and IMR2 are identical. In an alternative, the configuration of IMR2=ZP CSI-RS is according to at least one of alternative Alt 1.1.1 through Alt 1.1.4 (including the details or/and any restriction explained above).

In example embodiment 2.4, (IMR1, IMR2)=(NZP CSI-IM, ZP CSI-IM). The configuration of IMR1 (NZP CSI-IM resource) is according to Table 3. The parameter csi-IM-powerControlOffset is configured only for NZP CSI-IM resource when UE derives L1-SINR (in a beam report) or CQI (in a CSI feedback). In one example, it takes values in the range of [−8, 15] dB with 1 dB step size. The configuration of IMR2 (ZP CSI-IM resource) can include all configuration parameters of a NZP CSI-IM resource except that the parameter csi-IM-powerControlOffset is either not provided (absent) or is set to zero value. Note that the two time-frequency (T-F) patterns, pattern0 and pattern1 are supported for both NZP and ZP CSI-IM resources. For a ZP CSI-IM resource, the REs indicated by the time-frequency (T-F) patterns, pattern0 or pattern1, are declared "blanked", since there is no signal transmitted on those REs, and hence the measurement on those REs can be used for interference measurement. Such a configuration of (IMR1, IMR2) can be used for interference emulation as shown in Opt. B of FIG. 7, wherein 'NZP CSI-RS x' is replaced with IMR1 and 'CSI-IM y' is replaced with IMR2. Note that the RE patterns of IMR1 and IMR2 are identical. In an alternative, the configuration of IMR2=ZP CSI-IM is according to at least one of alternative Alt 1.2.1 through Alt 1.2.3 (including the details or/and any restriction explained above).

TABLE 8

| Configuration No. | Measurement | IMR1 (from A) | IMR2 (from B) |
| --- | --- | --- | --- |
| 1 | B is serving, interference (emulation) from A | NZP CSI-RS | ZP CSI-RS |
| 2 | B is serving, interference (emulation) from A | NZP CSI-IM | ZP CSI-IM |
| 3 | B is serving, interference (emulation) from A | NZP CSI-RS | ZP CSI-IM |
| 4 | B is serving, interference (emulation) from A | NZP CSI-IM | ZP CSI-RS |

The association between IMR1 and IMR2 can be established via a dedicated signaling, for example, using as a separate RRC component/parameter (e.g. in CSI framework) which established an association between IMR1 and IMR2, or using an existing RRC component/parameter (e.g. CSI-ReportConfig in the Rel. 15/16 NR CSI framework). An example of this association (configuration) is shown in Table 8. Alternatively, the association between IMR1 and IMR2 can be established implicitly. For example, a ZP IMR (IMR2) (e.g. ZP CSI-IM) is always associated with a NZP IMR (IMR1) resource, and this association is established implicitly, for example, via the configuration of the IMR1 resource.

In this embodiment (embodiment 2), the two IMRs (IMR1, IMR2) may not be associated with any other resources, i.e., they are used for interference measurement/emulation only. Though, this interference measurement/emulation can be linked to (or used for) L1-SINR calculation, or CSI feedback in general. This linking can be via a CSI reporting Setting parameter (e.g. CSI-ReportConfig).

In a variation of this embodiment (embodiment 2.5), the two IMRs (IMR1, IMR2) can be associated with an NZP CMR resource, which is configured to the UE for channel measurement. In this variation, the configured IMRs (IMR1, IMR2) and the CMR resource can be used to obtain some information about the DL channel, which can be CSI feedback (SINR, CQI, PMI etc.), or beam report (L1-SINR, CRI, etc.). The CMR and ZP IMR (IMR2) resources can be configured to be transmitted from the same TRP/panel or gNB, and the NZP IMR (IMR1) can be configured to be transmitted from a different TRP/panel or gNB, (which is the case when the UE is connected to two TRPs or gNBs, A and B, and receives CMR and IMR2 from A and IMR1 from B). An example of this association (configuration) is shown in Table 9. Or, the CMR and the two IMR (IMR1, IMR2) resources can be configured to be transmitted from three different TRPs/panels or gNBs (which is the case when the UE is connected to three TRPs or gNBs, A, B, and C, and receives CMR from A, IMR1 from B, and IMR2 from C). An example of this association (configuration) is shown in Table 10.

TABLE 9

| Configuration No. | Measurement | CMR (from A) | IMR1 (from B) | IMR2 (from A) |
|---|---|---|---|---|
| 1 | A is serving, interference (emulation) from B | NZP CSI-RS | NZP CSI-RS | ZP CSI-IM |
| 2 | A is serving, interference (emulation) from B | NZP CSI-RS | NZP CSI-IM | ZP CSI-IM |
| 3 | A is serving, interference (emulation) from B | NZP CSI-IM | NZP CSI-RS | ZP CSI-RS |
| 4 | A is serving, interference (emulation) from B | NZP CSI-IM | NZP CSI-IM | ZP CSI-RS |

TABLE 10

| Configuration No. | Measurement | CMR (from A) | IMR1 (from B) | IMR2 (from C) |
|---|---|---|---|---|
| 1 | A is serving, interference (emulation) from B | NZP CSI-RS | NZP CSI-RS | ZP CSI-IM |
| 2 | A is serving, interference (emulation) from B | NZP CSI-RS | NZP CSI-IM | ZP CSI-IM |
| 3 | A is serving, interference (emulation) from B | NZP CSI-IM | NZP CSI-RS | ZP CSI-RS |
| 4 | A is serving, interference (emulation) from B | NZP CSI-IM | NZP CSI-IM | ZP CSI-RS |
| 5 | A is serving, interference (emulation) from B and C | NZP CSI-RS | NZP CSI-RS | ZP CSI-RS |
| 6 | A is serving, interference (emulation) from B and C | NZP CSI-RS | NZP CSI-IM | ZP CSI-RS |
| 7 | A is serving, interference (emulation) from B and C | NZP CSI-IM | NZP CSI-RS | ZP CSI-IM |
| 8 | A is serving, interference (emulation) from B and C | NZP CSI-IM | NZP CSI-IM | ZP CSI-IM |

TABLE 11

| Configuration No. | Measurement | IMR0 (from A) | IMR1 (from B) | IMR2 (from C) |
|---|---|---|---|---|
| 1-8 (for Alt A-G for X, Y, Z) | B or C is serving, interference (emulation) from A | NZP X | ZP Y | ZP Z |
| 9-16 (for Alt A-G for X, Y, Z) | A or C is serving, interference (emulation) from B | ZP X | NZP Y | ZP Z |
| 17-24 (for Alt A-G for X, Y, Z) | A or B is serving, interference (emulation) from C | ZP X | ZP Y | NZP Z |
| 15-32 (for Alt A-G for X, Y, Z) | C is serving, interference (emulation) from A and B | NZP X | NZP Y | ZP Z |
| 33-40 (for Alt A-G for X, Y, Z) | B is serving, interference (emulation) from A and C | NZP X | ZP Y | NZP Z |
| 41-48 (for Alt A-G for X, Y, Z) | A is serving, interference (emulation) from B and C | ZP X | NZP Y | NZP Z |
| Alternatives for (X, Y, Z) | | | | |
| Alt | | X | Y | Z |
| A | | CSI-RS | CSI-RS | CSI-RS |
| B | | CSI-RS | CSI-RS | CSI-IM |
| C | | CSI-RS | CSI-IM | CSI-RS |
| D | | CSI-RS | CSI-IM | CSI-IM |
| E | | CSI-IM | CSI-RS | CSI-RS |
| F | | CSI-IM | CSI-RS | CSI-IM |
| G | | CSI-IM | CSI-IM | CSI-RS |
| H | | CSI-IM | CSI-IM | CSI-IM |

In a variation of this embodiment (embodiment 2.6), the (IMR1, IMR2) can be associated with an another IMR (say IMR0), which is configured to the UE for interference emulation. In this variation, the three configured IMRs can be used to obtain some information about the DL channel, which can be CSI feedback (SINR, CQI, PMI etc.), or beam report (L1-SINR, CRI, etc.). The three IMRs are configured to be transmitted from three different TRPs/panels or gNBs (which is the case when the UE is connected to three TRPs or gNBs, A, B, and C, and receives IMR0 from A, IMR1 from B, and IMR2 from C). A few examples of the three configured IMR pairs includes (NZP X, ZP Y, ZP Z), (ZP X, NZP Y, ZP Z), (ZP X, ZP Y, NZP Z), (NZP X, NZP Y, ZP Z), (ZP X, NZP Y, NZP Z), and (NZP X, ZP Y, NZP Z), where X, Y, and Z belongs to {CSI-RS, CS-IM}, and the T-F patterns of the three IMRs can be the same (overlapping) or different (non-overlapping or partial-overlapping). The association between the three IMRs can be established via a dedicated signaling or implicitly as explained above. An example of this association (configuration) is shown in Table 11.

For the third component (that is, interference measurement or emulation based on N>1 IMRs), in embodiment 3, a UE is configured with N IMRs ($IMR_1, \ldots, IMR_N$) for the purpose of interference measurement/estimation/emulation, where N1 IMRs are NZP and the rest (N2=N−1−N1) resources are ZP. The T-F RE patterns of the N IMRs ($IMR_1, \ldots, IMR_N$) can be identical (fully overlapping).

Figure 7:
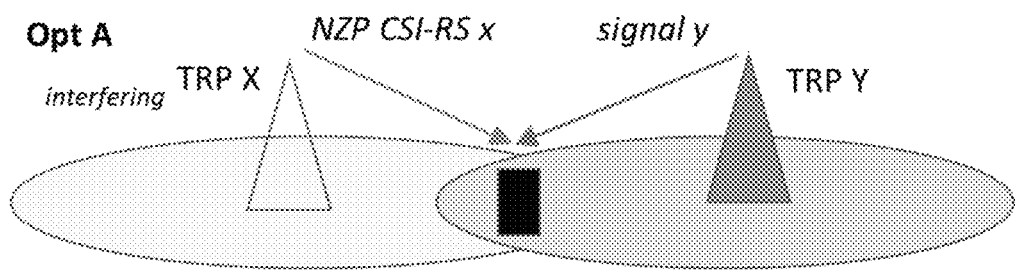
FIG. 7 illustrates example interference emulation and estimation for multiple transmit-receive points (TRPs) according to one or more embodiments of the present disclosure.
Figure 7:
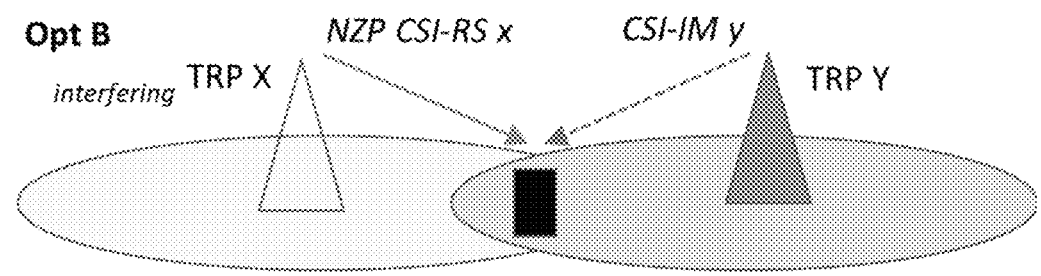

Such IMR configurations can be used for interference emulation purpose (cf. FIG. 7). Or, the T-F RE patterns of the N IMRs (IMR$_1$, ..., IMR$_N$) can be different but partially overlapping (have some overlapping REs). Such IMR configurations can be used for interference emulation (cf. FIG. 7) based on overlapping REs only.

A few examples of (IMR$_1$, ..., IMR$_N$) resources are as follows.

In example embodiment 3.1, $(N_1,N_2)=(1,N-1)$, which targets one interfering TRP/cell. For N TRPs/cells/gNBs, a UE is configured with one NZP CSI-RS/CSI-IM (for interference emulation) and (N−1) "ZP" CSI-RS(s)/CSI-IM(s) for the purpose of measuring interference from one particular TRP/cell/gNB. The one NZP CSI-RS/IM may or may not need to be configured for interference measurement (as a dedicated IMR for interference measurement) with respect to (w.r.t.) or from the measured interfering TRP/cell, i.e. it can be configured as a CMR w.r.t. the measured interfering TRP/cell. The NZP CSI-RS/IM and "ZP" CSI-RS/IM(s) resources occupy the same set of T-F REs (pattern) w.r.t. the serving TRP/cell, the UE is configured with CSI-RS/IM(s) "matching" (in RE location) an associated NZP CSI-RS/IM from the interfering TRP/cell.

In example embodiment 3.2, $(N_1,N_2)=(N-1,1)$, which targets an aggregate interference from N−1 TRPs/cells. For N TRPs/cells, a UE is configured with (N−1) NZP CSI-RSs/CSI-IMs (for interference emulation) and 1 "ZP" CSI-RS/CSI-IM for the purpose of measuring aggregate interference from (N−1) TRPs/cells. The N−1 NZP CSI-RS/IMs may or may not need to be configured for interference measurement (as dedicated IMRs for interference measurement) w.r.t. or from the measured interfering TRPs/cells, i.e. it can be configured for CMRs w.r.t. the measured interfering TRPs/cells. The NZP CSI-RS/IM and "ZP" CSI-RS/IM resources occupy the same set of REs (pattern) w.r.t serving TRP/cell, the UE is configured with CSI-RS/IM(s) "matching" (in RE location) an associated NZP CSI-RS/IM from the interfering TRP/cell.

In example embodiment 3.3, $(N_1>1,N_2>1)$ targets an aggregate interference from $N_1$ TRPs/cells. For N TRPs/cells, a UE is configured with $N_1$ NZP CSI-RSs/CSI-IMs (for interference emulation) and $N_2$ "ZP" CSI-RS/CSI-IM for the purpose of measuring aggregate interference from $N_1$ TRPs/cells. The $N_1$ NZP CSI-RS/IMs may or may not need to be configured for interference measurement (as dedicated IMRs for interference measurement) w.r.t. or from the measured interfering TRPs/cells, i.e. it can be configured for CMRs w.r.t. the measured interfering TRPs/cells. The NZP CSI-RS/IM and "ZP" CSI-RS/IM resources occupy the same set of REs (pattern) w.r.t serving TRP/cell, the UE is configured with CSI-RS/IM(s) "matching" (in RE location) an associated NZP CSI-RS/IM from the interfering TRP/cell.

The configuration of ZP CSI-RS as IMR is according to at least one of alternative Alt 1.1.1 through Alt 1.1.4 (including the details or/and any restriction explained above). Likewise, the configuration of ZP CSI-IM as IMR is according to at least one of alternative Alt 1.2.1 through Alt 1.2.3 (including the details or/and any restriction explained above).

Any of the above variation embodiments can be utilized independently or in combination with at least one other variation embodiment.

Figure 8:
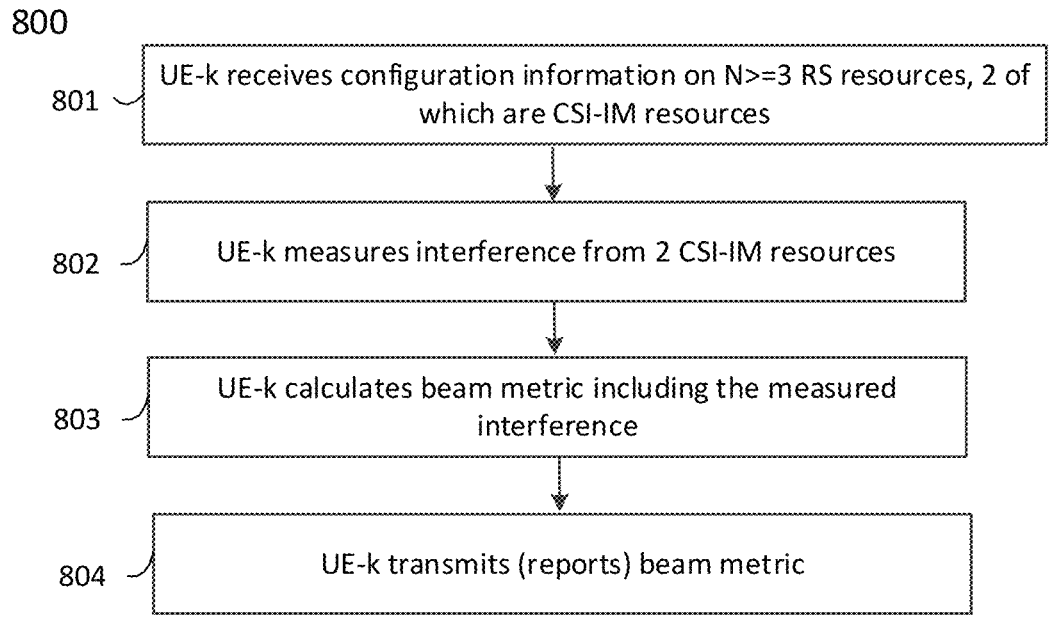
FIG. 8 illustrates a flowchart for an example method wherein a UE receives configuration information on reference signal (RS) resources for interference measurement according to one or more embodiments of the present disclosure.

FIG. 8 illustrates a flowchart for an example method 800 wherein a UE receives configuration information on RS resources for interference measurement according to an embodiment of the present disclosure. For example, the method 800 can be performed by the UE 116. The embodiment of the method 800 shown in FIG. 8 is for illustration only.

The method 800 begins with the UE (termed UE-k) receiving, from a base station, configuration information on at least three RS resources for interference measurement wherein two of those RS resources correspond to CSI-IM resources (step 801). The UE measures the interference based on the CSI-IM resources (step 802) and calculates a beam metric that includes the measured interference (step 803). Then, the UE transmits (reports) the calculated beam metric (step 804).

Out of the two CSI-IM resources, a first CSI-IM resource is zero power and a second CSI-IM resource is non-zero power. The zero power CSI-IM can be used to measure interference (as the signal part is blanked—which simplifies interference measurement) while the non-zero power CSI-IM can be used to emulate an interference source. The two CSI-IM resources can share a common frequency-domain resource element (RE) pattern or, optionally, the frequency-domain RE pattern of the first CSI-IM resource overlaps with that of the second CSI-IM resource. In addition, one of the RS resources corresponds to a channel measurement resource (CMR). The beam metric can include a layer-1 signal-to-interference-and-noise-ratio (L1-SINR) and at least one RS resource indicator.

Figure 9:
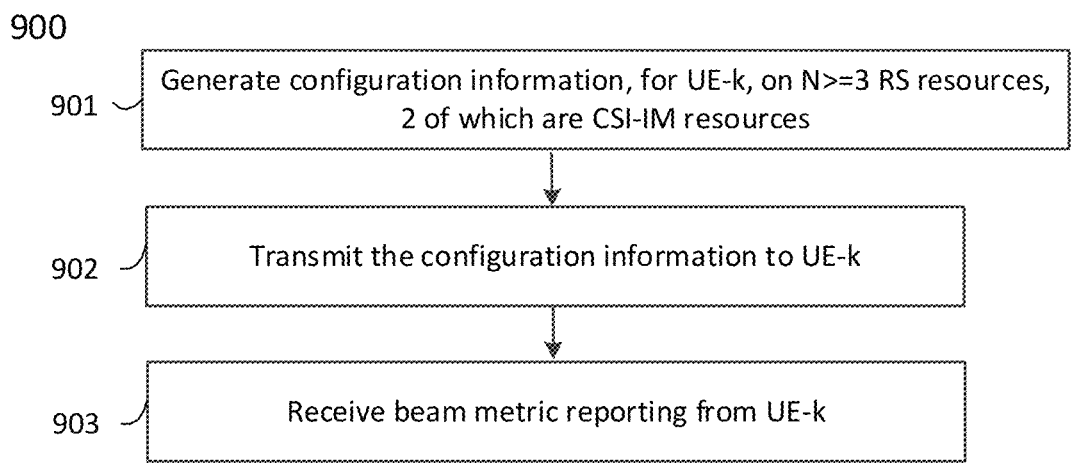
FIG. 9 illustrates a flowchart for an example method wherein a BS generates a configuration information on reference signal (RS) resources for interference measurement according to one or more embodiments of the present disclosure.

FIG. 9 illustrates a flowchart for an example method 900 wherein a BS generates configuration information on RS resources for interference measurement, to a UE (labeled as UE-k) according to an embodiment of the present disclosure. For example, the method 900 can be performed by the BS 102. The embodiment of the method 900 shown in FIG. 9 is for illustration only.

The method 900 begins with the BS generating, to UE-k, configuration information on at least three RS resources for interference measurement wherein two of those RS resources correspond to CSI-IM resources (step 902). The BS transmits the configuration information to UE-k (step 902). The BS also receives beam metric reporting from UE-k which includes interference measurement based on the two CSI-IM resources (step 903).

Out of the two CSI-IM resources, a first CSI-IM resource is zero power and a second CSI-IM resource is non-zero power. The zero power CSI-IM can be used to measure interference (as the signal part is blanked—which simplifies interference measurement) while the non-zero power CSI-IM can be used to emulate an interference source. The two CSI-IM resources can share a common frequency-domain resource element (RE) pattern or, optionally, the frequency-domain RE pattern of the first CSI-IM resource overlaps with that of the second CSI-IM resource. In addition, one of the RS resources corresponds to a channel measurement resource (CMR). The beam metric can include a layer-1 signal-to-interference-and-noise-ratio (L1-SINR) and at least one RS resource indicator.

Although FIGS. 8 and 9 illustrate examples of methods for receiving configuration information and configuring a UE, respectively, various changes can be made to FIGS. 8 and 9. For example, while shown as a series of steps, various steps in each figure can overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed:

1. A user equipment (UE) comprising:
a transceiver configured to receive configuration information on at least three reference signal (RS) resources, wherein:
two of the at least three RS resources correspond to channel state information interference measurement (CSI-IM) resources, a first of the CSI-IM resources being zero power and a second of the CSI-IM resources being non-zero power, and
a third of the at least three RS resources corresponds to a channel measurement resource (CMR); and
a processor operably connected to the transceiver, the processor configured to:
measure interference based on the CSI-IM resources; and
calculate a beam metric based on the measured interference,
wherein the transceiver is further configured to transmit the beam metric.

2. The UE of claim 1, wherein the two CSI-IM resources share a common frequency-domain resource element (RE) pattern.

3. The UE of claim 1, wherein a frequency-domain RE pattern of a first of the CSI-IM resources overlaps with that of a second of the CSI-IM resources.

4. The UE of claim 1, wherein a first of the CSI-IM resources is designated for interference measurement and a second of the CSI-IM resources is for emulating an interference source.

5. The UE of claim 1, wherein the beam metric indicates a layer-1 signal-to-interference-and-noise-ratio (L1-SINR) and includes at least one RS resource indicator.

6. A base station (BS) comprising:
a processor configured to generate configuration information on at least three reference signal (RS) resources, wherein:
two of the at least three RS resources correspond to channel state information interference measurement (CSI-IM) resources, a first of the CSI-IM resources being zero power and a second of the CSI-IM resources being non-zero power, and
a third of the at least three RS resources corresponds to a channel measurement resource (CMR); and
a transceiver operably connected to the processor, the transceiver configured to:
transmit, to a user equipment (UE), the configuration information, and
receive, from the UE, a beam metric that indicates an interference measurement based on the CSI-IM resources.

7. The BS of claim 6, wherein the two CSI-IM resources share a common frequency-domain resource element (RE) pattern.

8. The BS of claim 6, wherein a first of the CSI-IM resources is designated for interference measurement and a second of the CSI-IM resources is for emulating an interference source.

9. The BS of claim 6, wherein the beam metric indicates a layer-1 signal-to-interference-and-noise-ratio (L1-SINR) and includes at least one RS resource indicator.

10. A method for operating a user equipment (UE), the method comprising:
receiving configuration information on at least three reference signal (RS) resources, wherein:
two of the at least three RS resources correspond to channel state information interference measurement (CSI-IM) resources, a first of the CSI-IM resources being zero power and a second of the CSI-IM resources being non-zero power, and
a third of the at least three RS resources corresponds to a channel measurement resource (CMR);
measuring interference based on the CSI-IM resources;
calculate a beam metric based on the measured interference; and
transmitting the beam metric.

11. The method of claim 10, wherein the two CSI-IM resources share a common frequency-domain resource element (RE) pattern.

12. The method of claim 10, wherein a frequency-domain resource element (RE) pattern of a first of the CSI-IM resources overlaps with that of a second of the CSI-IM resources.

13. The method of claim 10, wherein a first of the CSI-IM resources is designated for interference measurement and a second of the CSI-IM resources is for emulating an interference source.

14. The method of claim 10, wherein the beam metric indicates a layer-1 signal-to-interference-and-noise-ratio (L1-SINR) and includes at least one RS resource indicator.

* * * * *